(12) United States Patent
Huang (10) Patent No.: US 7,923,977 B2
(45) Date of Patent: Apr. 12, 2011

(54) DC-DC CONVERTERS WITH TRANSIENT RESPONSE CONTROL

(75) Inventor: Hua-Chiang Huang, Hsin-Chu (TW)

(73) Assignee: UPI Semiconductor Corporation, Taipei (TW)

( * ) Notice: Subject to any disclaimer, the term of this patent is extended or adjusted under 35 U.S.C. 154(b) by 458 days.

(21) Appl. No.: 12/149,352

(22) Filed: Apr. 30, 2008

(65) Prior Publication Data

US 2009/0153114 A1 Jun. 18, 2009

Related U.S. Application Data

(60) Provisional application No. 61/013,256, filed on Dec. 12, 2007.

(51) Int. Cl.
*G05F 1/40* (2006.01)

(52) U.S. Cl. .......................... 323/271; 323/285

(58) Field of Classification Search .......... 323/222–225, 323/268, 271, 282–285
See application file for complete search history.

(56) References Cited

U.S. PATENT DOCUMENTS

| | | | |
|---|---|---|---|
| 6,292,378 B1 * | 9/2001 | Brooks et al. | 363/65 |
| 7,023,188 B1 * | 4/2006 | Rice | 323/271 |
| 7,045,992 B1 * | 5/2006 | Silva et al. | 323/222 |
| 7,126,388 B2 * | 10/2006 | Harriman | 327/108 |
| 7,215,102 B2 * | 5/2007 | Harris et al. | 323/268 |
| 7,298,124 B2 * | 11/2007 | Kan et al. | 323/283 |
| 7,382,114 B2 * | 6/2008 | Groom | 323/271 |
| 7,443,150 B2 * | 10/2008 | Schiff | 323/282 |
| 7,652,461 B2 * | 1/2010 | Tateishi | 323/284 |
| 7,872,546 B1 * | 1/2011 | Mohtashemi et al. | 332/108 |
| 2005/0073288 A1 * | 4/2005 | Harris | 323/282 |
| 2005/0083024 A1 * | 4/2005 | Harris et al. | 323/282 |
| 2005/0088156 A1 * | 4/2005 | Cheung et al. | 323/282 |
| 2006/0055381 A1 * | 3/2006 | Rice | 323/271 |
| 2006/0119340 A1 * | 6/2006 | Tateishi | 323/284 |

* cited by examiner

*Primary Examiner* — Matthew V Nguyen
(74) *Attorney, Agent, or Firm* — Birch, Stewart, Kolasch & Birch, LLP (57) ABSTRACT

A DC-DC converter used to convert an input voltage to an output voltage is disclosed. The DC-DC converter comprises a pulse-width-modulation (PWM) generator, a transient boost circuit, a logic circuit, a switching device, and a buck circuit. The pulse-width-modulation (PWM) generator generates a PWM signal according to the output voltage. The transient boost circuit generates an adjusting signal according to the variation of the output voltage. The logic circuit generates a switch signal according to the PWM signal and the adjusting signal. The switching signal is at a high level when the PWM signal or the adjusting signal is at the high level, and the switching signal is at a low level when the PWM signal and the adjusting signal are at the low level. The switching device converts the input voltage to a driving signal according to the switching signal. The buck circuit receives the driving signal to generate the output voltage.

26 Claims, 6 Drawing Sheets

DC-DC CONVERTERS WITH TRANSIENT RESPONSE CONTROL

CROSS REFERENCE TO RELATED APPLICATIONS

This application claims the benefit of U.S. Provisional Application No. 61/013,256, filed on Dec. 12, 2007 and entitled "Transient Boost Method of DC-DC Converters". The entire contents of which are hereby incorporated by reference.

BACKGROUND OF THE INVENTION

1. Field of the Invention

The invention relates to a direct-current (DC) to direct-current (DC) converter, and more particularly to a DC-DC converter capable of transient response control according to the variation of output voltage of the DC-DC converter.

2. Description of the Related Art

DC-DC converters are widely used in the field of electronics to convert an input DC voltage to an output DC voltage higher or lower than the input DC voltage. Such circuitry or devices, which typically have semiconductor switching-control topology, are highly efficient and small in dimensions, and therefore constitute an important part for power supplies in various electronic apparatuses. A DC-DC converter has a controller, which receives feedback signals, such as current or voltage feedback signals, to adjust the output voltage or current to a desired level.

A DC-DC converter may include a control loop that contains an error amplifier, a pulse-width modulation (PWM) comparator, and one or more drivers, usually coupled with a synchronous rectifier to improve performance. The output voltage is compared with a reference voltage by the error amplifier. The PWM comparator receives the output of the error amplifier as its first input and receives a saw-tooth or a triangle signal as its second input. The PWM comparator's output is a PWM signal that is amplified by the drivers driving the power switches. The advantages of this kind of converters are their simplicity in architecture and high precision. Its major disadvantage, however, is its slow response to load transients because of the compensation needed on the error amplifier. Therefore, a need exists in the art to address the aforementioned deficiencies and inadequacies.

BRIEF SUMMARY OF THE INVENTION

The invention provides a DC-DC converter used to convert an input voltage to an output voltage. The DC-DC converter comprises a pulse-width-modulation (PWM) generator, a transient boost circuit, a logic circuit, a switching device, and a buck circuit. The PWM generator generates a PWM signal according to the output voltage. The transient boost circuit generates an adjusting signal according to the variation of the output voltage. The logic circuit generates a switch signal according to the PWM signal and the adjusting signal. The switching signal is at a high level when the PWM signal or the adjusting signal is at the high level, and the switching signal is at a low level when the PWM signal and the adjusting signal are at the low level. The switching device converts the input voltage to a driving signal according to the switching signal. The buck circuit receives the driving signal to generate the output voltage.

The invention also provides a multi-phase DC-DC converter used to convert an input voltage to an output voltage. The multi-phase DC-DC converter comprises a plurality of pulse-width-modulation (PWM) generators, a transient boost circuit, a plurality of logic circuits, a plurality of switching devices, and a buck circuit. The PWM generators generate PWM signals according to the output voltage. The transient boost circuit generates an adjusting signal according to the variation of the output voltage. The logic circuits generate switch signals each corresponding to one of the PWM signals. The switching signal is at a high level when the corresponding PWM signal or the adjusting signal is at the high level, and the switching signal is at a low level when the corresponding PWM signal and the adjusting signal are at the low level. The switching devices convert the input voltage to driving signals according to the switching signals. The buck circuit receives the driving signals to generate the output voltage.

The invention also provides a multi-phase DC-DC converter used to convert an input voltage to an output voltage. The multi-phase DC-DC converter comprises a plurality of pulse-width-modulation (PWM) generators, a plurality of transient boost circuits, a plurality of logic circuits, a plurality of switching devices, and a buck circuit. The PWM generators generate PWM signals according to the output voltage. The transient boost circuits generate adjusting signals according to the variation of the output voltage. The logic circuits generate switch signals each corresponding to one of the PWM signals and one of the adjusting signals. The switching signal is at a high level when the corresponding PWM signal or the corresponding adjusting signal is at the high level, and the switching signal is at a low level when the corresponding PWM signal and the corresponding adjusting signal are at the low level. The switching devices convert the input voltage to driving signals according to the switching signals. The buck circuit receives the driving signals to generate the output voltage.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
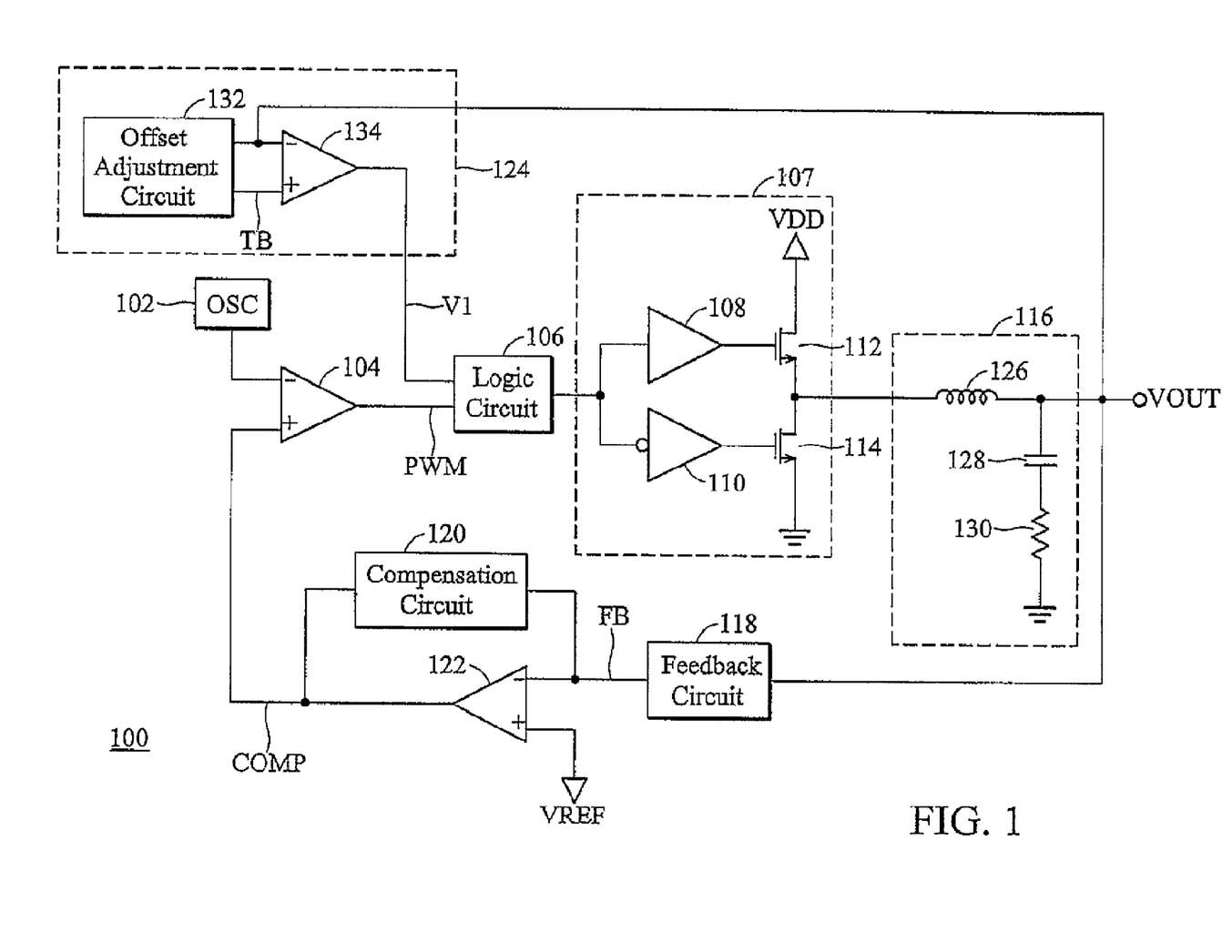
FIG. 1 is an embodiment of a DC-DC converter with a single-phase PWM channel according to the invention.

FIG. 1 shows an embodiment of a DC-DC converter with a single-phase PWM channel according to the invention. The converter 100 may comprise a ramp oscillator 102, a PWM comparator 104, a logic circuit 106, drivers 108 and 110, NMOS transistors 112 and 114, a buck circuit 116, a feedback circuit 118, a compensation circuit 120, an error amplifier 122, and a transient boost circuit 124. The feedback circuit 118 may comprise resistors that divide an output voltage VOUT to generate a feedback voltage FB. The error amplifier 122 compares voltage FB with a reference voltage VREF to generate a signal COMP. The compensation circuit 120 can mitigate the variations of the signal COMP. The signal COMP may increase while voltage VOUT decreases, and decrease while voltage VOUT increases. The PWM comparator 104 can be regarded as a PWM generator to generate a PWM signal according to the output voltage VOUT. The ramp oscillator 102 may generate a saw-tooth or a triangle signal as a ramp signal. The PWM comparator 104 compares the ramp signal generated from the ramp oscillator 102 with the signal COMP to generate the signal PWM. The signal PWM is at a high level when the ramp signal is lower than the signal COMP; otherwise, the signal PWM is at a low level when the ramp signal is higher than the signal COMP. The transient boost circuit 124 receives the voltage VOUT and then generates a signal V1 according to the variation of the voltage VOUT. The logic circuit 106 can be a logic gate such as an OR gate, and receives the signal V1 and the signal PWM to generate a switching signal. The switching signal is at a high level, if either the signal V1 or the signal PWM is at a high level, and the switching signal is at a low level, if both the signal V1 and the signal PWM are at a low level. The drivers 108 and 110 and the NMOS transistors 112 and 114 together form a switching device to convert the input voltage VDD to a driving signal according to the switching signal. The driving signal is a voltage at a node between the NMOS transistors 112 and 114. The drivers 108 and 110 receive the output signal from the logic circuit 106 to alternatively turn on the NMOS transistors 112 and 114. Accordingly, the driving signal is equal to the input voltage VDD when the NMOS transistor 112 is turned on and the NOMS transistor 114 is turned off, and the driving signal is equal to the ground voltage when the NMOS transistor 114 is turned on and the NMOS transistor 112 is turned off. The buck circuit 116 comprises an inductor 126 coupled to the NMOS transistors 112 and 114, a capacitor 128 coupled to the inductor 126, and a resistor 130 coupled between the capacitor 128 and the ground. The buck circuit 116 receives the driving signal to convert the input voltage VDD to the output voltage VOUT. The output voltage VOUT can be supplied to a load needed to be driven by direct current.

Figure 2A:
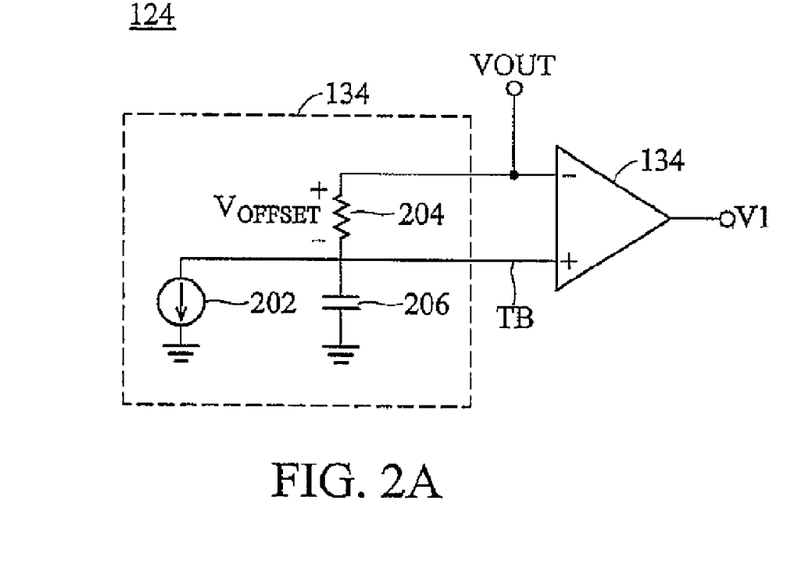
FIGS. 2A and 2B are two embodiments of transient boost circuits.
Figure 3:
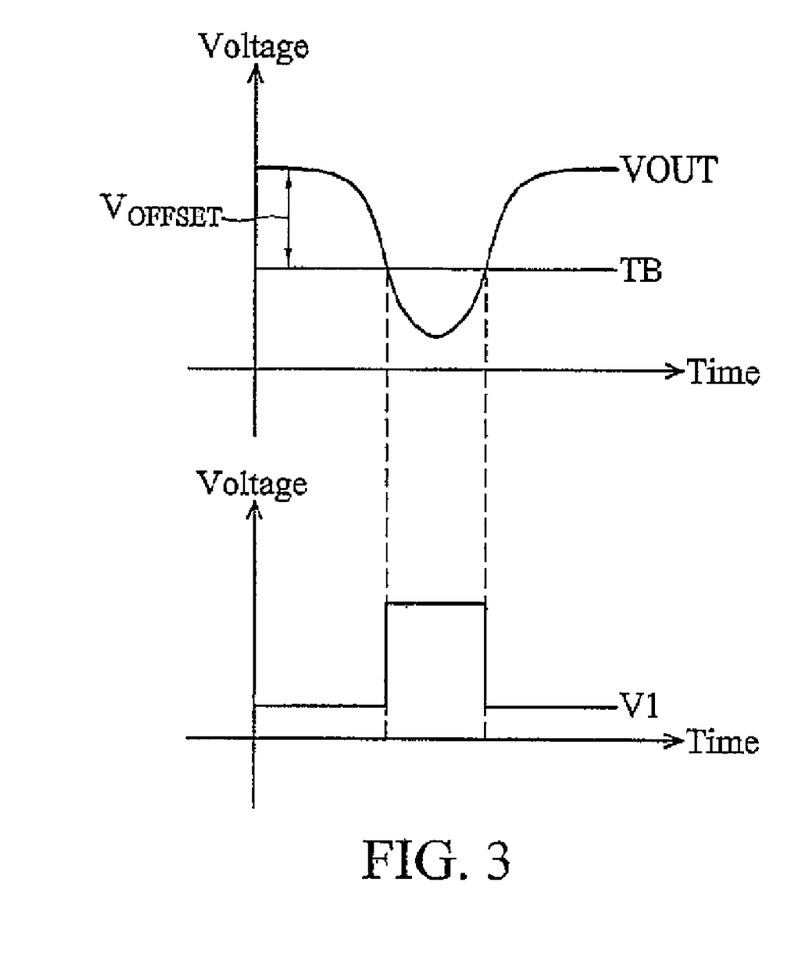
FIG. 3 is an exemplary signal waveform of FIG. 1.

The transient boost circuit 124 comprises an offset adjustment circuit 132 and a comparator 134. The offset adjustment circuit 132 receives the voltage VOUT and then generates a transient boost voltage TB having an offset voltage corresponding to the voltage VOUT. The comparator 134 can be an operational amplifier. The comparator 134 receives the voltage VOUT at its inverting terminal and the voltage TB at its non-inverting terminal, and compares the voltage VOUT with the voltage TB to generate an adjusting signal V1. FIG. 2A shows an embodiment of transient boost circuit 124. The offset adjustment circuit 132 may comprise a current source 202, a resistor 204, and a capacitor 206. The input offset voltage $V_{OFFSET}$ between the voltage VOUT and the voltage TB is determined by the resistance of the resistor 204 and the current generated by the current source 202. The resistor 204 and the capacitor 206 together form a low-pass filter (LPF) to stabilize the voltage TB, so that the voltage TB can be fixed at a voltage having a voltage offset $V_{OFFSET}$ corresponding to a steady state of the voltage VOUT. Referring to FIG. 3, the voltage VOUT is initially kept at a steady state when the load connected to the DC-DC converter 100 is unchanged, and the transient boost voltage TB has a voltage offset $V_{OFFSET}$ corresponding to the voltage VOUT. When the voltage VOUT drops due to current load event, the voltage TB does not respond immediately because of the low-pass filter. Accordingly, the comparator 134 can generate a high level signal as an adjusting signal V1 if the voltage VOUT drops lower than the voltage TB. On the contrary, the comparator 134 can generate a low level signal as the signal V1 if the voltage VOUT becomes higher than the voltage TB. The positive pulse of the signal V1 forces the NMOS transistor 112 to be turned on to supply more current to the load, thereby pulling up the voltage VOUT. One advantage of the embodiment is that the transient boost circuit 124 has a quicker response to the current load event than the signal PWM, because the signal COMP varies with the voltage VOUT with a time delay.

Figure 2B:
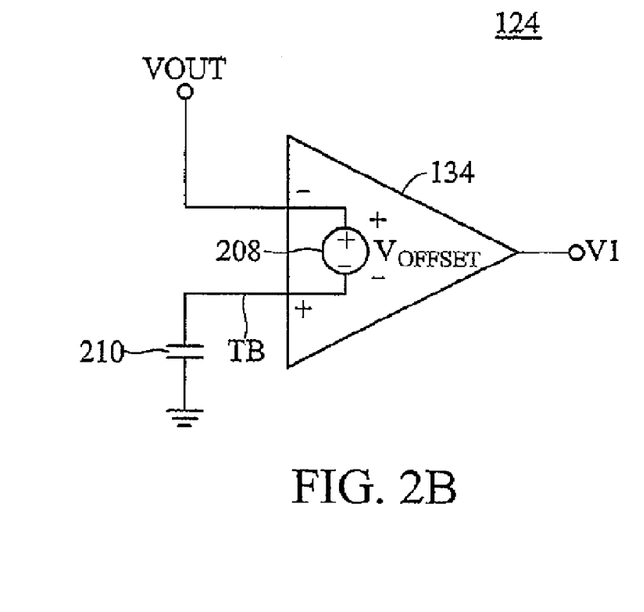

In another embodiment, the offset adjustment can be implemented in the comparator 134. Referring to FIG. 2B, an offset voltage source 208 inside the comparator 134 is used to provide the input offset voltage $V_{OFFSET}$ between the voltage VOUT and the voltage TB, and the capacitor 210 is used to stabilize the voltage TB. To implement the internal offset voltage source 208 in the comparator 134, the size of the transistors at the input stage of the comparator 134 can be made to be mismatched to generate an input offset. For example, the offset voltage can be set as 100~200 mV, with the offset value dependent on the design rule according to realistic implementations.

Figure 4:
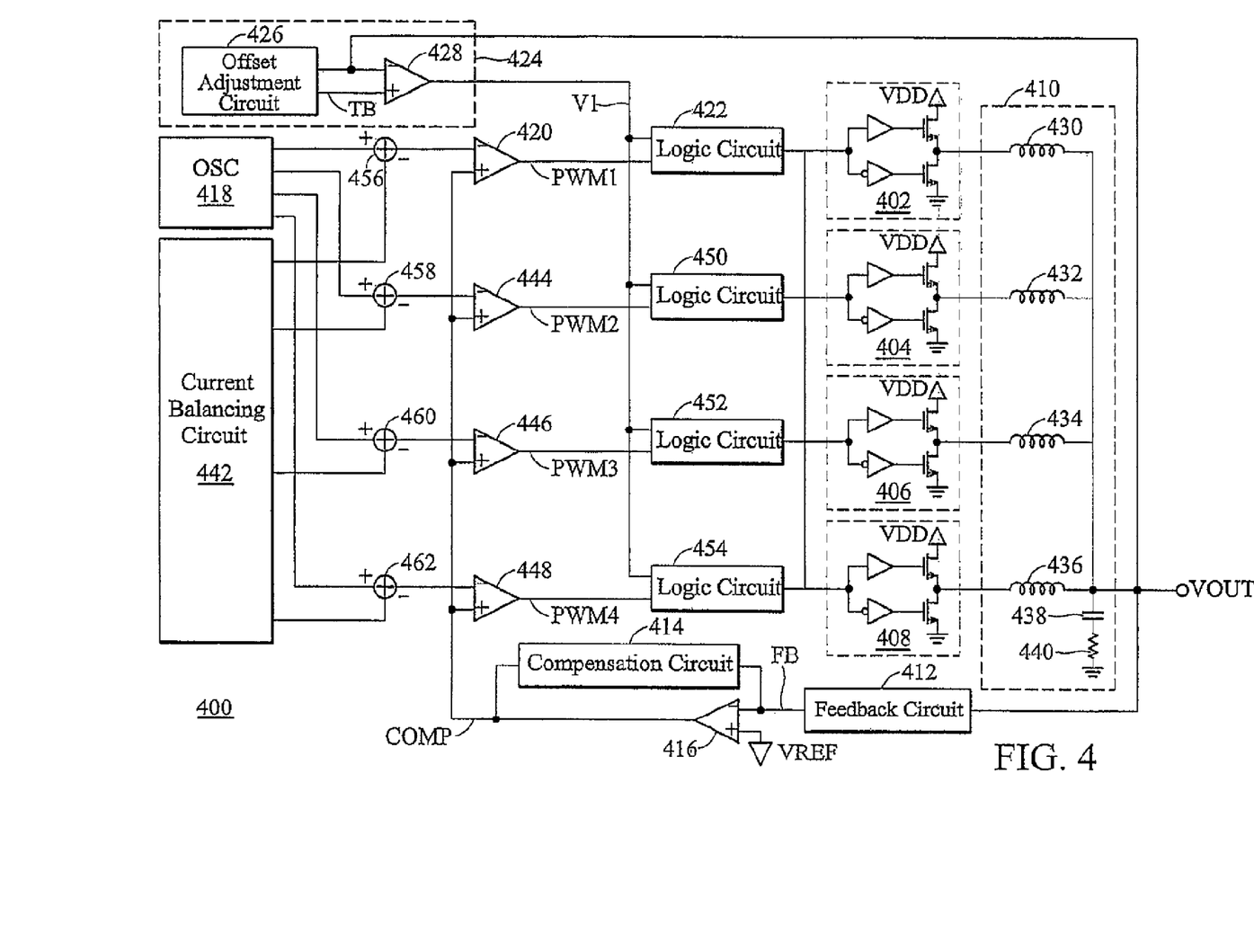
FIG. 4 is an embodiment of a DC-DC converter with multi-phase PWM channels according to the invention.

FIG. 4 shows an embodiment of a DC-DC converter with multi-phase PWM channels according to the invention. The converter 400 comprises four switching devices 402, 404, 406, and 408, a buck circuit 410, a feedback circuit 412, a compensation circuit 414, an error amplifier 416, a ramp oscillator 418, four PWM comparators 420, 444, 446, and 448, four logic circuits 422, 450, 452, and 454, a transient boost circuit 424, a current balancing circuit 442, and four adders 456, 458, 460, and 462. The switching devices 402, 404, 406, and 408 are turned on or off respectively according to the switching signals output by the logic circuits 422, 450, 452, and 454. It is noted that more or less PWM channels can be implemented in the converter 400. The buck circuit 410 can receive driving signals output by the switching devices 402, 404, 406, and 408 to generate the output voltage VOUT. The buck circuit 410 can comprise four inductors 430, 432, 434, and 436, a capacitor 438, and a resistor 440. Each inductor 430, 432, 434, and 436 is respectively coupled to each PWM channel 402, 404, 406, and 408. The capacitor 438 is coupled to the inductors 430, 432, 434, and 436, and the resistor 440 is coupled between the capacitor 438 and the ground. The feedback circuit 412 can comprise resistors that divide an output voltage VOUT to generate a feedback voltage FB. The error amplifier 416 compares the voltage FB with a reference voltage VREF to generate a signal COMP. The compensation circuit 414 can mitigate the variation of the signal COMP. The signal COMP increases if the voltage VOUT decreases, and the signal COMP decreases if the voltage VOUT increases.

The ramp oscillator 418 can output four ramp signals (i.e., four saw-tooth or triangular signals) to each PWM comparator 420, 444, 446, and 448 via adders 456, 458, 460, and 462. Each ramp signal can be individually compensated by the current balancing circuit 442. The current balancing circuit 442 can sense the currents generated from the switching devices 402, 404, 406, and 408 to fine tune the four ramp signals by offsetting the four ramp signals through the adders 574, 576, 578, and 580. In another embodiment, the current balancing circuit 442 can fine tune the signal COMP instead of the ramp signals. Each PWM comparators 420, 444, 446, and 448 can be regarded as a PWM generator to generate a PWM signal according to the output voltage VOUT. The PWM comparators 420, 444, 446, and 448 respectively compare the four compensated ramp signals with the signal COMP to generate signals PWM1, PWM2, PWM3, and PWM4. For example, the signals PWM1 is output as a high level when the corresponding ramp signal (i.e., the signal input at the inverting terminal of PWM comparator 420) is lower than the signal COMP; otherwise, the signal PWM1 is output as a low level signal when the corresponding ramp signal is higher than the signal COMP. The transient boost circuit 424 receives the voltage VOUT and then generates the adjusting signal V1 according to the variation of the voltage VOUT.

Each logic circuit 422, 450, 452, and 454 can be a logic gate such as an OR gate. The logic circuit 422 can receive the signal V1 and the signal PWM1 to output the corresponding switching signal as a high level signal if either the signal V1 or the signal PWM1 is at a high level; otherwise, the corresponding switching signal is output as a low level signal if both the signal V1 and the signal PWM1 are at a low level. The logic circuit 450 can receive the signal V1 and the signal PWM2 to output the corresponding switching signal as a high level signal if either the signal V1 or the signal PWM2 is at a high level; otherwise, the corresponding switching signal is output as a low level signal if both the signal V1 and the signal PWM2 are at a low level. The logic circuit 452 can receive the signal V1 and the signal PWM3 to output the corresponding switching signal as a high level signal if either the signal V1 or the signal PWM3 is at a high level; otherwise, the corresponding switching signal is output as a low level signal if both the signal V1 and the signal PWM3 are both at a low level. The logic circuit 454 can receive the signal V1 and the signal PWM4 to output the corresponding switching signal as a high level signal if either the signal V1 or the signal PWM4 is at a high level; otherwise, the corresponding switching signal is output as a low level signal if both the signal V1 and the signal PWM4 are both at a low level.

The transient boost circuit 424 can comprise an offset adjustment circuit 426 and a comparator 428. The transient boost circuit 424 can also be implemented as the structure of FIG. 2A or FIG. 2B. The comparator 428 generates the signal V1 as a high level if the voltage VOUT drops lower than the voltage TB; on the contrary, the comparator 428 generates the signal V1 as a low level if the voltage VOUT is kept higher than the voltage TB. It should be noted that all the switching devices 402, 404, 406, and 408 at the same time, pull up the voltage VOUT by supplying additional current to the load when the voltage signal V1 is at a high level.

Figure 5:
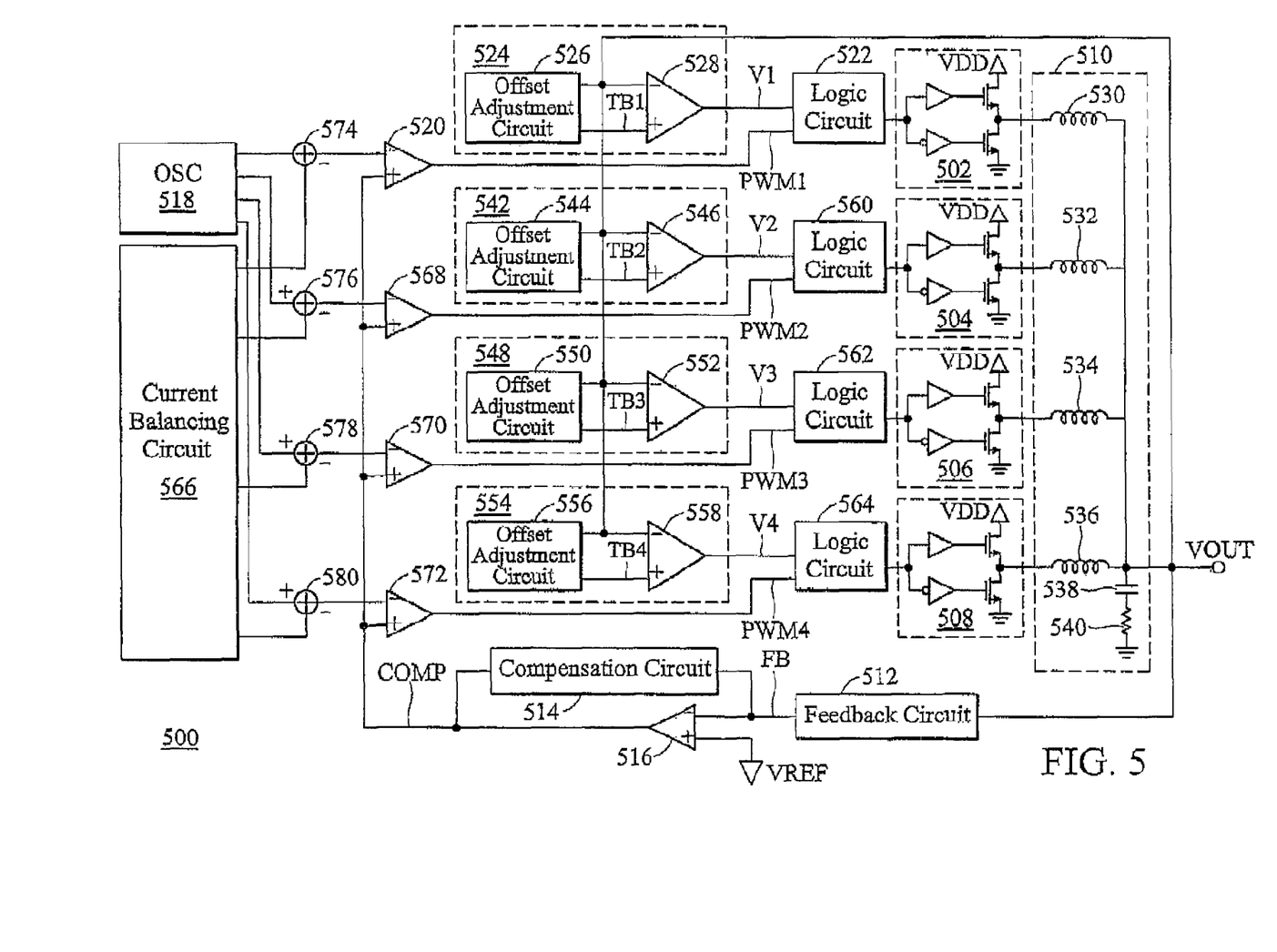
FIG. 5 is another embodiment of a DC-DC converter with multi-phase PWM channels according to the invention.

FIG. 5 shows another embodiment of a DC-DC converter with multi-phase PWM channels according to the invention. The converter 500 comprises four switching device 502, 504, 506, and 508, a buck circuit 510, a feedback circuit 512, a compensation circuit 514, an error amplifier 516, a ramp oscillator 518, a current balancing circuit 566, four adders 574, 576, 578, and 580, four PWM comparators 520, 568, 570, 572, four logic circuits 522, 560, 562, and 564, and four transient boost circuits 524, 542, 548, 554. The switching device 502, 504, 506, and 508 can be turned on or off individually to generate driving signals according to the switching signals output by each logic circuit 522, 560, 562, and 564. The buck circuit 510 can receive the driving signals output by the switching devices 502, 504, 506, and 508 to generate the output voltage VOUT. The buck circuit 510 may comprise four inductors 530, 532, 534, and 536, a capacitor 538, and a resistor 540. The structure of the buck circuit 510 can be the same as that of the buck circuit 410 in FIG. 4 and will not be described hereafter for brevity. The feedback circuit 512 can comprise resistors that divide the output voltage VOUT to generate a feedback voltage FB. The error amplifier 516 compares the voltage FB with a reference voltage VREF to generate a signal COMP. The compensation circuit 514 can mitigate the variation of the signal COMP. The signal COMP increases if the voltage VOUT decreases, and the signal COMP decreases if the voltage VOUT increases. The ramp oscillator 518 can output four ramp signals (i.e., four saw-tooth or triangular signals) to each PWM comparator 520, 568, 570, and 572 via adders 574, 576, 578, and 580. Each ramp signal can be individually compensated by the current balancing circuit 566. The current balancing circuit 566 can sense the currents generated from the switching devices 502, 504, 506, and 508 to fine tune the four ramp signals by offsetting the four ramp signals through the adders 574, 576, 578, and 580. In another embodiment, the current balancing circuit 566 can fine tune the signal COMP instead of the ramp signals.

Each PWM comparators 520, 568, 570, and 572 can be regarded as a PWM generator to generate a PWM signal according to the output voltage VOUT. The PWM comparators 520, 568, 570, and 572 respectively compare the four compensated ramp signals with signal COMP to generate signals PWM1, PWM2, PWM3, and PWM4. For example, the signals PWM1 can be output as a high level signal when the corresponding ramp signal (i.e., the signal input at the inverting terminal of PWM comparator 520) is lower than signal COMP; otherwise, the signal PWM1 is output as a low level signal when the corresponding ramp signal is higher than the signal COMP.

Figure 6:
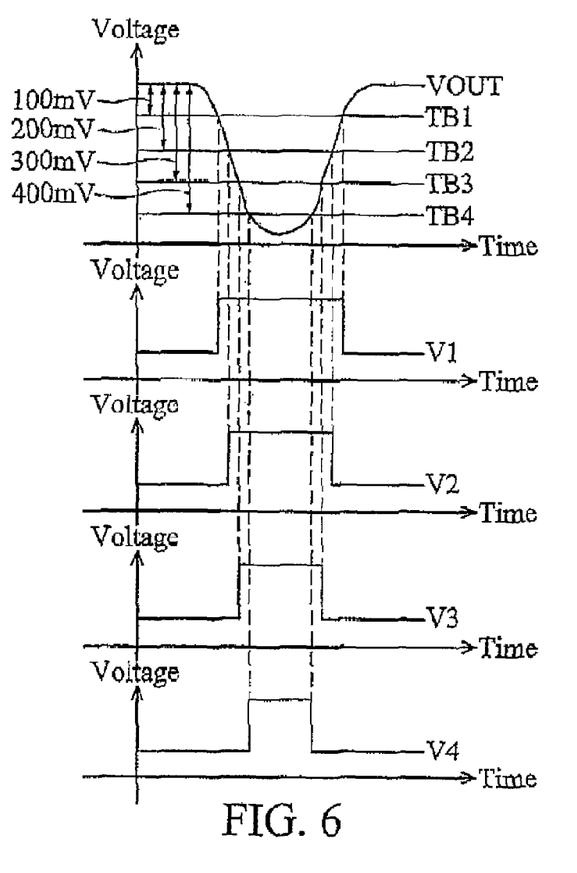
FIG. 6 is an exemplary signal waveform of FIG. 5.

The transient boost circuit 524 may comprise the offset adjustment circuit 526 and the comparator 528, the transient boost circuit 542 comprises the offset adjustment circuit 544 and the comparator 546, the transient boost circuit 548 comprises the offset adjustment circuit 550 and the comparator 552, and the transient boost circuit 554 comprises the offset adjustment circuit 556 and the comparator 558. Each transient boost circuit 524, 542, 548, and 554 can be implemented as the structure of FIG. 2A but with different offset voltages. For example, referring to FIG. 6, each offset adjustment circuit 526, 544, 550, and 556 respectively provides 100 mV offset voltage for the voltage TB1, 200 mV offset voltage for the voltage TB2, 300 mV offset voltage for the voltage TB3, and 400 mV offset voltage for the voltage TB4. The comparator 528 would generate a positive pulse V1 as the adjusting signal to turn on the switching device 502 if the voltage VOUT drops lower than the voltage TB1. Similarly, the comparator 546 would generate a positive pulse V2 as the adjusting signal to turn on the switching device 504 if the voltage VOUT drops lower than the voltage TB2, the comparator 552 would generate a positive pulse V3 as the adjusting signal to turn on the switching device 506 if the voltage VOUT drops lower than the voltage TB3, and the comparator 558 would generate a positive pulse V4 as the adjusting signal to turn on the switching device 508 if the voltage VOUT drops lower than the voltage TB4. One advantage of the embodiment is that the switching devices can be individually turned on according to how deep the output voltage VOUT drops, and the DC-DC converter increases current supply to the load as the output voltage VOUT drops deeper. The offset voltage values are not limited to the embodiments, and other values can also be implemented according to the design rule of realistic implementations. In another embodiment, the input offset voltage can be implemented in the comparator 528, 546, 552, and 558, such as the structure of FIG. 2B.

Each logic circuit 522, 560, 562, and 564 can be a logic gate such as an OR gate. The logic circuit 522 can receive the adjusting signal V1 and the signal PWM1 to output the switching signal as a high level signal if either the adjusting signal V1 or the signal PWM1 is at a high level; otherwise, the switching signal is output as a low level signal if both the adjusting signal V1 and the signal PWM1 are at a low level. The logic circuit 560 can receive the adjusting signal V2 and the signal PWM2 to output the switching signal as a high level signal if either the adjusting signal V2 or the signal PWM2 is at a high level; otherwise, the switching signal is output as a low level signal if both the adjusting signal V2 and the signal PWM2 are at a low level. The logic circuit 562 can receive the adjusting signal V3 and the signal PWM3 to output the switching signal as a high level signal if either the adjusting signal V3 or the signal PWM3 is at a high level; otherwise, the switching signal is output as a low level signal if both the adjusting signal V3 and the signal PWM3 are both at a low level. The logic circuit 564 can receive the adjusting signal V4 and the signal PWM4 to output the switching signal as a high level signal if either the adjusting signal V4 or the signal PWM4 is at a high level; otherwise, the switching signal is output as a low level signal if both the adjusting signal V4 and the signal PWM4 are both at a low level.

While the invention has been described by way of examples and in terms of preferred embodiments, it is to be understood that the invention is not limited thereto. Any variation or modification can be made by those skilled in art without departing from the spirit or scope of the invention. Therefore, the scope of the appended claims should be accorded the broadest interpretation to encompass all such modifications and similar arrangements.

What is claimed is:

1. A DC-DC converter used to convert an input voltage to an output voltage, comprising:
   a pulse-width-modulation (PWM) generator configured to generate a PWM signal according to the output voltage;
   a transient boost circuit configured to generate an adjusting signal according to the variation of the output voltage;
   a logic circuit configured to generate a switch signal, wherein the switching signal is at a high level when the PWM signal or the adjusting signal is at the high level and the switching signal is at a low level when the PWM signal and the adjusting signal are at the low level;
   a switching device configured to convert the input voltage to a driving signal according to the switching signal; and
   a buck circuit configured to receive the driving signal to generate the output voltage.

2. The DC-DC converter as claimed in claim 1, wherein the transient boost circuit further comprises:
   an offset adjustment circuit configured to receive the output voltage to generate a transient boost voltage having a voltage offset corresponding to a steady state of the output voltage; and
   a comparator configured to compare the output voltage with the transient boost voltage to generate the adjusting signal.

3. The DC-DC converter as claimed in claim 2, wherein the adjusting signal is at the high level when the transient boost voltage is higher than the output voltage, and the adjusting signal is at the low level when the transient boost voltage is lower than the output voltage.

4. The DC-DC converter as claimed in claim 2, wherein the offset adjustment circuit further comprises:
   a capacitor, coupled to a non-inverting terminal of the comparator, configured to sustain the transient boost voltage;
   a current source, coupled to the non-inverting terminal, configured to generate a current; and
   a resistor, coupled between a inverting terminal of the comparator and the non-inverting terminal, configured to generate the voltage offset.

5. The DC-DC converter as claimed in claim 4, wherein the voltage offset is generated as a resistance of the resistor multiplied by the current.

6. The DC-DC converter as claimed in claim 1, wherein the transient boost circuit further comprises:
   a capacitor configured to sustain a transient boost voltage; and
   a comparator, having an inverting terminal coupled to the output voltage and a non-inverting terminal coupled to the capacitor, configured to compare the output voltage with the transient boost voltage to generate the adjusting signal, wherein the comparator has an input offset between the inverting and non-inverting terminals.

7. The DC-DC converter as claimed in claim 6, wherein the adjusting signal is at the high level when the output transient boost voltage is higher than the output voltage, and the adjusting signal is at the low level when the output transient boost voltage is lower than the output voltage.

8. The DC-DC converter as claimed in claim 1, wherein the logical circuit is an OR gate.

9. A multi-phase DC-DC converter used to convert an input voltage to an output voltage, comprising:
   a plurality of pulse-width-modulation (PWM) generators configured to generate PWM signals according to the output voltage;
   a transient boost circuit configured to generate an adjusting signal according to the variation of the output voltage;
   a plurality of logic circuits configured to generate switch signals each corresponding to one of the PWM signals, wherein the switching signal is at a high level when the corresponding PWM signal or the adjusting signal is at the high level and the switching signal is at a low level when the corresponding PWM signal and the adjusting signal are at the low level;
   a plurality of switching devices configured to convert the input voltage to driving signals according to the switching signals; and
   a buck circuit configured to receive the driving signals to generate the output voltage.

10. The multi-phase DC-DC converter as claimed in claim 9, wherein the transient boost circuit further comprises:
    an offset adjustment circuit configured to receive the output voltage to generate a transient boost voltage having a voltage offset corresponding to a steady state of the output voltage; and
    a comparator configured to compare the output voltage with the transient boost voltage to generate the adjusting signal, wherein the adjusting signal is at the high level when the transient boost voltage is higher than the output voltage, and the adjusting signal is at the low level when the transient boost voltage is lower than the output voltage.

11. The multi-phase DC-DC converter as claimed in claim 10, wherein the transient boost circuit further comprises:
    a capacitor, coupled to a non-inverting terminal of the comparator, configured to sustain the transient boost voltage;
    a current source, coupled to the non-inverting terminal, configured to generate a current; and
    a resistor, coupled between a inverting terminal of the comparator and the non-inverting terminal, configured to generate the voltage offset.

12. The multi-phase DC-DC converter as claimed in claim 11, wherein the voltage offset is generated as a resistance of the resistor multiplied by the current.

13. The multi-phase DC-DC converter as claimed in claim 9, wherein the transient boost circuit further comprises:
    a capacitor configured to sustain a transient boost voltage; and
    a comparator, having an inverting terminal coupled to the output voltage and a non-inverting terminal coupled to the capacitor, configured to compare the output voltage with the transient boost voltage to generate the adjusting signal, wherein the comparator has an input offset between the inverting and non-inverting terminals, and the transient boost voltage is equal to a steady state of the output voltage minus the input offset.

14. The multi-phase DC-DC converter as claimed in claim 9, wherein each logical circuit is an OR gate.

15. A multi-phase DC-DC converter used to convert an input voltage to an output voltage, comprising:
 a plurality of pulse-width-modulation (PWM) generators configured to generate PWM signals according to the output voltage;
 a plurality of transient boost circuits configured to generate adjusting signals according to the variation of the output voltage;
 a plurality of logic circuits configured to generate switch signals each corresponding to one of the PWM signals and one of the adjusting signals, wherein the switching signal is at a high level when the corresponding PWM signal or the corresponding adjusting signal is at the high level and the switching signal is at a low level when the corresponding PWM signal and the corresponding adjusting signal are at the low level;
 a plurality of switching devices configured to convert the input voltage to driving signals according to the switching signals; and
 a buck circuit configured to receive the driving signals to generate the output voltage.

16. The multi-phase DC-DC converter as claimed in claim 15, wherein each transient boost circuit further comprises:
 an offset adjustment circuit configured to receive the output voltage to generate a transient boost voltage having a voltage offset corresponding to a steady state of the output voltage; and
 a comparator configured to compare the output voltage with the transient boost voltage to generate the adjusting signal.

17. The multi-phase DC-DC converter as claimed in claim 16, wherein the adjusting signal is at the high level when the transient boost voltage is higher than the output voltage, and the adjusting signal is at the low level when the transient boost voltage is lower than the output voltage.

18. The multi-phase DC-DC converter as claimed in claim 15, wherein the transient boost circuit further comprises:
 a capacitor configured to sustain a transient boost voltage; and
 a comparator, having an inverting terminal coupled to the output voltage and a non-inverting terminal coupled to the capacitor, configured to compare the output voltage with the transient boost voltage to generate the adjusting signal.

19. The multi-phase DC-DC converter as claimed in claim 18, wherein the comparator has an input offset between the inverting and non-inverting terminals, and the transient boost voltage is equal to a steady state of the output voltage minus the input offset.

20. The multi-phase DC-DC converter as claimed in claim 15, wherein each logical circuit is an OR gate.

21. The DC-DC converter as claimed in claim 1, further comprising:
 a feedback circuit generating a feedback signal according to the output voltage;
 an error amplifier comparing the feedback signal with a reference voltage to generate a comparison signal, wherein the pulse-width-modulation (PWM) generator generates the PWM signal according to the comparison signal and a ramp signal generated from a ramp oscillator.

22. The DC-DC converter as claimed in claim 21, further comprising a compensation circuit coupled between the feedback circuit and the pulse-width-modulation (PWM) generator, and mitigating a variation of the comparison signal.

23. The multi-phase DC-DC converter as claimed in claim 9, further comprising:
 a feedback circuit generating a feedback signal according to the output voltage;
 an error amplifier comparing the feedback signal with a reference voltage to generate a comparison signal, wherein the plurality of pulse-width-modulation (PWM) generators generate the PWM signals according to the comparison signal and a ramp signal generated from a ramp oscillator.

24. The multi-phase DC-DC converter as claimed in claim 23, further comprising a compensation circuit coupled between the feedback circuit and the plurality of pulse-width-modulation (PWM) generators, and mitigating a variation of the comparison signal.

25. The multi-phase DC-DC converter as claimed in claim 15, further comprising:
 a feedback circuit generating a feedback signal according to the output voltage;
 an error amplifier comparing the feedback signal with a reference voltage to generate a comparison signal, wherein the plurality of pulse-width-modulation (PWM) generators generate the PWM signals according to the comparison signal and a ramp signal generated from a ramp oscillator.

26. The multi-phase DC-DC converter as claimed in claim 25, further comprising a compensation circuit coupled between the feedback circuit and the plurality of pulse-width-modulation (PWM) generators, and mitigating a variation of the comparison signal.

\* \* \* \* \*